Jan. 13, 1959  D. G. MEACHAM  2,867,905
DENTAL WEDGE
Filed June 1, 1953

*INVENTOR.*
DOUGLAS G. MEACHAM
BY
*Knox & Knox*
AGENTS FOR APPLICANT

United States Patent Office 2,867,905
Patented Jan. 13, 1959

2,867,905
DENTAL WEDGE

Douglas G. Meacham, Seattle, Wash.

Application June 1, 1953, Serial No. 358,639

1 Claim. (Cl. 32—63)

The present invention relates generally to dental equipment and more particularly to a dental wedge.

The primary object of this invention is to provide a dental wedge which will securely retain a dental matrix in correct position to facilitate tooth filling operation, in such a way that there will be no overhang or over extension of amalgam into the gingival or gum tissue causing irritation thereof.

Another object of this invention is to provide a dental wedge of hard but slightly compressible character such as lemon wood which will also swell slightly when wet.

Another object of this invention is to provide a dental wedge of generally triangular cross-section and having slightly concave contacting surfaces to locate against two adjacent teeth and a gum when said wedge is inserted in an interproximal space.

Another object of this invention is to provide a dental wedge which is longitudinally tapered to assist secure lodgement of said wedge in an interproximal space.

Another object of this invention is to provide a dental wedge which is non-injurious chemically or physically to gums or natural teeth.

Another object of this invention is to provide a dental wedge coated with a pliable thermoplastic low fusing dental impression compound or like material which will conform and adhere to the contours of teeth and matrix band when said wedge is heated slightly and inserted in an interproximal space, and will therefore assist in securely retaining said wedge and consequently a dental matrix in correct position.

Another object of this invention is to provide a dental wedge which may be used when there is a very wide interproximal gingival space. The slightly heated wedge is inserted from either the buccal or the lingual aspect of the interproximal space, this wedge being held in place from the side inserted while another heated wedge is inserted in the opposite side, the heat of the second wedge making possible the fusion of the plastic coatings of the two wedges which have been overlapped so that the wedges are locked together.

Another object of this invention is to provide a wedge which will slightly separate the tooth being restored from the adjacent tooth at least the thickness of the matrix material, so that when the wedge and matrix are removed there will be a tight contact between the teeth.

Another object of this invention is to provide, in the case of concave gingival margin quite often found in amalgam cavity preparations of bicuspids and deeply extending gingival margins of molar preparations, a snug fit of the matrix to the axial surface of the tooth being restored, by cutting away the uncoated butt end of the wedge and inserting the large end of the remaining coated wedge after heating.

Another object of this invention, ancillary to the preceding objects, is to teach the best known mode of implementing the principles of the invention in carrying the invention into actual practice.

Another object of this invention is to provide a dental wedge which is adapted for fabrication from many different materials, so that the choice of material can be according to the dictates of availability and price considerations, the exact sizes and proportions being matters easily determined to suit particular conditions and needs.

Another object of this invention is to provide a dental wedge which is inexpensive and practicable to manufacture.

Finally, it is an object to provide a dental wedge of the aforementioned character which is simple, safe and convenient to operate, and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawing which forms a material part of this disclosure and wherein similar characters of reference indicate similar or identical elements and portions throughout the specification and throughout the views of the drawing, and in which:

Figure 1:
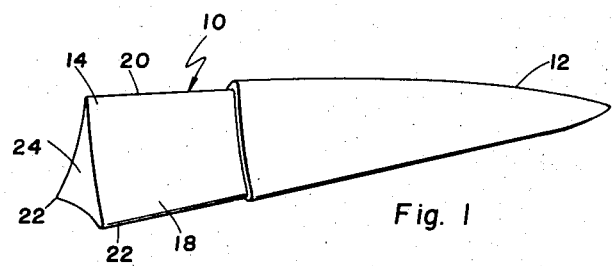
Fig. 1 is a perspective view of the invention.
Figure 3:
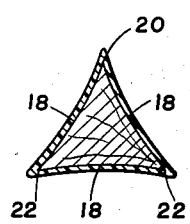
Fig. 3 is a transverse sectional view taken on the line 3—3 of Fig. 2.

Referring in detail to the drawing, it will be evident that my dental wedge comprises a body 10 and a plastic coating 12.

The body 10 is longitudinally tapered and has a butt end 14 and a pointed end 16. The body 10 is generally triangular in cross-section having three slightly concave sides 18, so that the body is longitudinally fluted from the butt end 14 to the pointed end 16 of said body 10. The edge 20 formed by the juncture of two of the sides 18 is coextensive in length with the body 10 and is slightly curved. The edges 22 extending from the butt end 14 to the pointed end 16 are rectilinear. The butt end 14 of the body 10 has a transverse flat surface 24, said flat surface 24 being designed to be engaged by a suitable tool to facilitate the insertion of my dental wedge into an interproximal space.

The body 10 can be fabricated from wood, or any other suitable material which is reasonably hard while being slightly compressible and which will swell slightly when wet without becoming soft. Lemon wood is exemplary of materials fulfilling the above-mentioned requirements, although other materials can be utilized.

The plastic coating 12 forms a sheath over the major portion of the body 10, extending from the pointed end 16 and leaving the butt end 14 exposed. The plastic coating 12 is of such character as to adhere to the body 10, while being sufficiently pliable to conform to the contours of an interproximal space when my dental wedge is inserted therein, a thermo-plastic substance being preferable so that the coating conforms and adheres to the teeth and matrix band when the wedge is heated. The plastic coating 12 could be applied to the body 10 by several methods, one suggested process being the dipping of the body 10 in a solution of suitable plastic material and the subsequent removal of the solvent by evaporation or other suitable method. Dental impression compound has been found to be suitable for use as the plastic coating 12 and any similar substance remaining suitably pliable at ambient temperatures may be employed.

The use of my dental wedge is illustrated in detail in

Figures 4, 5:
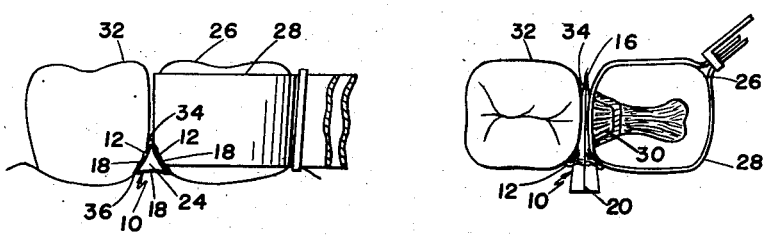
Fig. 4 is an elevational view, showing the invention in position in an interproximal space.
Fig. 5 is a plan view showing the invention in position in an interproximal space.

Figs. 4 and 5 of the drawing. The natural tooth 26 is firmly encircled by the conventional matrix band 28, which forms a wall opposed to a cavity preparation 30 in the side of the tooth 26. Adjacent to the tooth 26 is the tooth 32 and between said teeth 26 and 32 is the interproximal space 34. The numeral 36 denotes the gum between the teeth 26 and 32. The pointed end 16 is inserted into the interproximal space 34 so that the edge 20 extends away from the gum 36. The sides 18 of the body 10 locate against the gum 36, the tooth 32 and a portion of the matrix band 28. The body 10 is forced farther into the interproximal space by pressure of a suitable tool on the surface 24. A portion of the plastic material 12 will be carried to the side of the teeth remote from the point of entry and the dental surgeon may choose to compact this portion of the material and thus lessen the likelihood of inadvertent dislodgement of the wedge.

The slightly compressible nature of the body 10 permits minor conformity of said body 10 to the contours of the interproximal space so that no damage is caused to the teeth 26 and 32. Moisture in the mouth of the patient is absorbed by the body 10 causing said body to swell slightly thus effecting more secured lodgement of the body 10 and the wedge holds the adjacent teeth, illustrated by the teeth 28 and 32, slightly apart during the actual filling so that upon removal of the wedge and matrix the teeth will spring back to leave no gap therebetween. It will be evident that the concave sides 18 will permit a greater area of contact than would be possible with straight sides. The plastic coating 12 tends to fill any crevices remaining between the body 10 and the tooth 32, the matrix band 28 and the gum 36 and, due to its moldable character, assists in retaining said body 10 in position.

Figure 2:
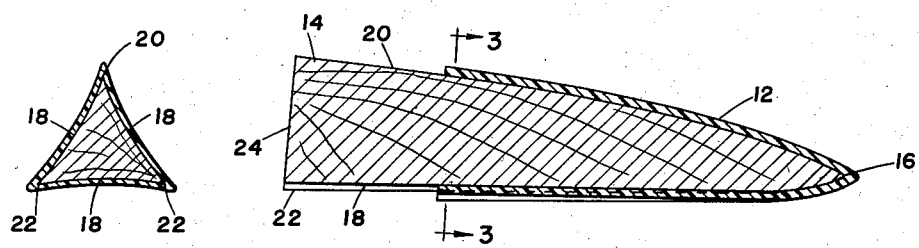
Fig. 2 is a longitudinal sectional view.

It will be seen from Fig. 2 that the curved edge 20 provides the body 10 with a greater degree of taper at the pointed end 16 than at the butt end 14. This assists in a more rapid closure of the narrow portion of the interproximal space 34 opposite to the gum 36 and provides greater support to the portion of the matrix band 28 adjacent to said narrow portion. In addition, the more gradual taper adjacent to the butt end 14 lessens any tendency of the wedge to work loose and to become dislodged after said body has been correctly positioned in the interproximal space 34.

Figure 6:
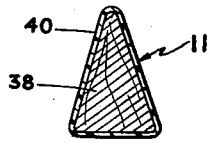
Fig. 6 is a transverse sectional view of a modified wedge form.

A modified configuration of the device is illustrated in Fig. 6 in which the body 38 is of simple triangular cross-section, the plastic coating 40 and the longitudinal contours of the body being similar to those already described.

The operation of this invention will be clearly comprehended from a consideration of the foregoing description of the mechanical details thereof, taken in connection with the drawing and the above recited objects. It will be obvious that all said objects are amply achieved by this invention.

Further description would appear to be unnecessary.

It is understood that minor variation from the form of the invention disclosed herein may be made without departure from the spirit and scope of the invention, and that the specification and drawing are to be considered as merely illustrative rather than limiting.

I claim:

In a dental wedge, an elongated body of hard slightly compressible material tapering throughout its length from a butt end to a pointed end, said body being adapted to swell slightly when moistened and having a generally triangular cross sectional configuration with the entire width of each side face concave slightly in relation to its thickness, said body being formed so as to fit tightly in the space between a matrix on one tooth and an adjacent tooth so as to temporarily spread the teeth to securely retain the matrix in tooth filling position and a plastic coating fitted upon said body extending longitudinally from the pointed end and of a material fusible at a comparatively low temperature to tightly retain the wedge in position and to enable fusion of more than one wedge in a space of greater width than one wedge.

References Cited in the file of this patent

UNITED STATES PATENTS

| 106,773 | Blake | Aug. 30, 1870 |
| 2,016,597 | Drake | Oct. 8, 1935 |

FOREIGN PATENTS

| 10,368 | Switzerland | May 4, 1895 |